United States Patent
Li et al.

(10) Patent No.: US 8,843,470 B2
(45) Date of Patent: Sep. 23, 2014

(54) META CLASSIFIER FOR QUERY INTENT CLASSIFICATION

(71) Applicant: Microsoft Corporation, Redmond, WA (US)

(72) Inventors: Xiaolong Li, Sammamish, WA (US); Ye-Yi Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/645,737

(22) Filed: Oct. 5, 2012

(65) Prior Publication Data
US 2014/0101119 A1    Apr. 10, 2014

(51) Int. Cl.
G06F 17/30    (2006.01)

(52) U.S. Cl.
USPC ............................ 707/708; 707/737; 707/771

(58) Field of Classification Search
USPC ......... 707/708, 770, 771, 726, 769, 728, 731, 707/737, 749, 798
See application file for complete search history.

(56) References Cited

U.S. PATENT DOCUMENTS

| | | | |
|---|---|---|---|
| 7,383,260 B2 | 6/2008 | Smith et al. | |
| 7,440,968 B1 | 10/2008 | Oztekin et al. | |
| 7,747,601 B2 * | 6/2010 | Cooper et al. | 707/708 |
| 7,949,672 B2 | 5/2011 | Zhang et al. | |
| 8,069,182 B2 * | 11/2011 | Pieper | 707/769 |
| 8,145,622 B2 | 3/2012 | Yin et al. | |
| 8,560,539 B1 * | 10/2013 | Engebretsen | 707/736 |
| 8,719,249 B2 * | 5/2014 | Bennett et al. | 707/708 |
| 2005/0055341 A1 * | 3/2005 | Haahr et al. | 707/3 |
| 2009/0006345 A1 | 1/2009 | Platt et al. | |
| 2009/0094223 A1 * | 4/2009 | Berk et al. | 707/5 |
| 2010/0114855 A1 * | 5/2010 | Li et al. | 707/708 |
| 2010/0293174 A1 * | 11/2010 | Bennett et al. | 707/759 |
| 2010/0299336 A1 * | 11/2010 | Bergstraesser et al. | 707/759 |
| 2010/0306144 A1 | 12/2010 | Scholz et al. | |
| 2010/0318516 A1 | 12/2010 | Kolen et al. | |
| 2011/0125791 A1 | 5/2011 | Konig et al. | |
| 2011/0289025 A1 | 11/2011 | Yan et al. | |
| 2012/0209831 A1 * | 8/2012 | Rehman | 707/723 |
| 2013/0091131 A1 * | 4/2013 | Szymanski et al. | 707/731 |

OTHER PUBLICATIONS

Konig, et al., "Click-Through Prediction for News Queries", In Proceedings of 32nd Annual ACM SIGIR Conference on Research and Development in Information Retrieval, Jul. 19, 2009, 8 pages.

(Continued)

*Primary Examiner* — Debbie Le
(74) *Attorney, Agent, or Firm* — Dave Ream; Doug Barker; Micky Minhas

(57) ABSTRACT

Systems and methods are provided for classifying a search query. A first group of query classifiers can be used to evaluate a query relative to various subject matter domains. The evaluation results from the first group of domain classifiers can then be used by a second group of meta-classifiers. The meta-classifiers are based on non-linear classification models. The meta-classifiers are associated with meta-classifier categories that may correspond to a domain or that may correspond to a plurality of domains. The assigned meta-classifier category for a query can be used in any convenient manner, such as by triggering additional uses of the search query to match images or other alternative types of documents, or such as by allowing a subject matter domain to be assigned to the query.

20 Claims, 9 Drawing Sheets

(56) References Cited

OTHER PUBLICATIONS

Hu, et al., "Understanding User's Query Intent with Wikipedia", In Proceedings of International World Wide Web Conference Committee, Apr. 20, 2009, 10 pages.

Lu, et al., "Coupling Feature Selection and Machine Learning Methods for Navigational Query Identification", In Proceedings of 15th Conference on Information and Knowledge Management, 2006, Nov. 5, 2006, 8 pages.

Yan, et al., The Design and Implementation of Parallel Digitial Library Management System, in Journal of Computer Science, vol. 1, Issue 2, Apr. 2005, 7 pages.

Li, et al., Multi-Domain Adaptation for Sentiment Classification: Using Multiple Classifier Combining Methods, in Proceedings of International Conference on Natural Language Processing and Knowledge Engineering, Oct. 19-22, 2008, 8 pages.

Ranawana, et al., Multi-Classifier Systems-Review and a Roadmap for Developers, Published on Apr. 24, 2006, available at: http://citeseerx.ist.psu.edu/viewdoc/download?doi=10.1.102.2123&rep=rep1&type=pdf.

Song, et al., Highly Accurate Distributed Classification of Web Documents, in Proceedings of the 2009 International Symposium on Web Information Systems and Applications, May 22-24, 2009, 4 pages.

Non-Final Office Action re U.S. Appl. No. 13/267,163, dated Nov. 21, 2012, 38 pages.

Final Office Action re U.S. Appl. No. 13/267,163, dated Jun. 19, 2013, 29 pages.

\* cited by examiner

META CLASSIFIER FOR QUERY INTENT CLASSIFICATION

BACKGROUND

Query classification provides a method for improving the relevance of results returned in response to a query. When a query potentially matches several different types of results, query classification can assist in selecting the likely intent of the person submitting the query. Unfortunately, query classification can be a resource intensive process. Additionally, many queries are potentially related to more than one type of subject matter. Improved methods for assigning such queries to the correct category without requiring excessive additional resources are desirable.

SUMMARY

In various embodiments, systems and methods are provided for classifying a search query. A first group of query classifiers can be used to evaluate a query relative to various subject matter domains. This initial evaluation provides some type of probability or other score (such as a ranking) for a query relative to the subject matter domains. The evaluation results from the first group of domain classifiers can then be used by a second group of meta-classifiers. The meta-classifiers are associated with meta-classifier categories that may correspond to a domain or that may correspond to a plurality of domains. Preferably, the meta-classifiers are initially trained using a data set different from the set of queries (or other training data) used for training a corresponding subject matter domain classifier and/or any of the first group of domain classifiers. The meta-classifiers use the data from the first group of domain classifiers to evaluate the query relative to the meta-classifier categories. If the query corresponds to one or more of the meta-classifier categories, the query is assigned to at least one of the corresponding categories. Preferably, the meta-classifiers are based on a non-linear ensemble model for combining the information from the domain classifiers to generate a meta-classifier ranking, probability, or other score. The assigned meta-classifier category can then be used in any convenient manner, such as by triggering additional uses of the search query to match images or other alternative types of documents, or such as by allowing a subject matter domain to be assigned to the query.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

Figure 1:
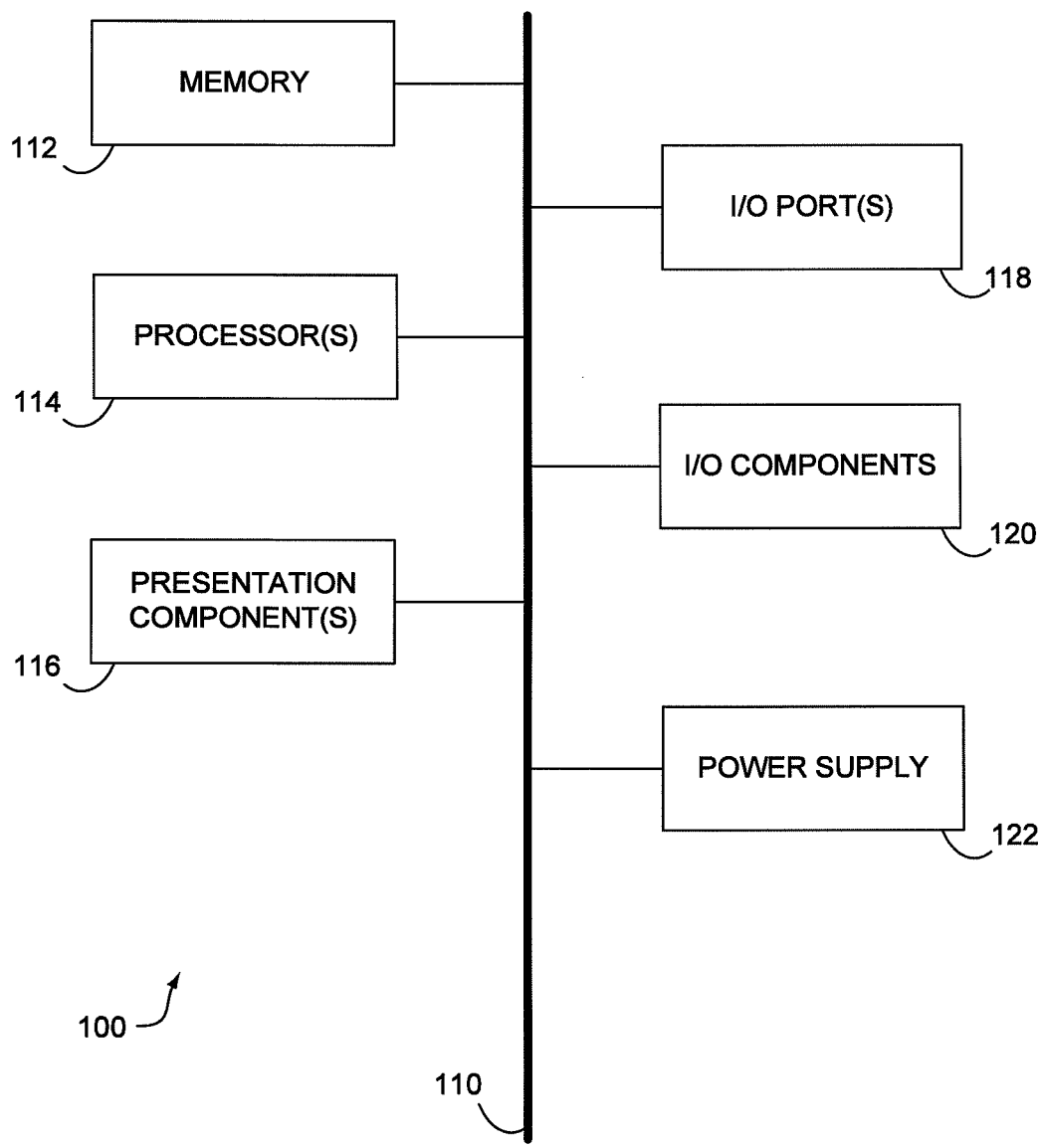
FIG. 1 is a block diagram of an exemplary computing environment suitable for use in implementing embodiments of the present invention.

One of the difficulties with query classification is handling the large number of factors that can be considered while still providing a result on the time scale required for using the query class as a factor in providing search results. One option is to define multiple subject matter domains for classifying documents and/or queries. Multiple classifiers, optionally running on multiple processors, can then be used in parallel to determine the relevance of a document or query to the plurality of possible domains. In this discussion, a domain is a subject matter category, such as shopping, sports, entertainment, movies, or politics. It is noted that some domains may be subsets of other domains. For example, "movies" may be a subset of "entertainment", or the two domains can be viewed as unrelated. Other domains can include categories such as images or commerce. Based on the plurality of domains, multiple processors can be used as query classifiers to evaluate the query relative to each domain. The query is then assigned to a domain based on the evaluation by the various processors.

The above strategy allows for analysis of a query relative to various domains on a time scale that is useful providing results in response to the query. However, some queries may appear to be relevant to more than one domain after evaluation. A query that is highly ranked or otherwise evaluated as being relevant to more than one domain can be referred to as an ambiguous query. In a scenario where each domain classifier is handled by a separate processor in order to maximize the advantage of parallel evaluation, each processor will be focused on evaluating whether a query belongs to a single domain. More generally, regardless of the amount of parallelization, the various domain classifiers will not necessarily have access to factors that are unrelated to the domain being evaluated. As a result, if more than one domain is ranked highly or otherwise is evaluated as corresponding to a query, none of the query classifiers will have all of the information that would be beneficial for determining how to assign the ambiguous query. Alternatively, if it is desirable to limit the query classification to a maximum number of classes, or to make assignments to certain classes mutually exclusive of each other, none of the query classifiers will have all of the appropriate information to choose between competing evaluations with similar scores.

Another difficulty with use of subject matter domain classifiers can arise with domains that have significant overlap with many other domains. For example, it may be desirable to have a separate domain corresponding to images (or videos, or generally to multimedia content). Having a separate image domain is potentially beneficial, as identifying a query as belonging to the image domain would allow a separate image search to be triggered based on the assignment of the query to the image domain. When a query is assigned to the image domain, the assignment can be used to trigger a separate search based on query classification. Performing a separate image-based search is beneficial for providing improved results in response to a query. An additional benefit can be achieved if such an assignment to the image domain can be effectively made using a query classification that does not rely on results generated from processing the search query against the primary document index. Although the results from processing a search query against the primary document index can provide a further indication of whether a query should be assigned to an image domain, waiting for such search results prior to triggering an image index search will increase the latency time of responding to a query.

A query that has high relevance scores for multiple domains poses an increased challenge in determining whether the query should also be assigned (or possibly exclusively assigned) to the image domain. For example, various types of image queries may also have high classification scores for domains such as sports, entertainment, commerce, or travel. Because the definition of an "image" domain is in some ways orthogonal to the definitions for other domains that are more directly focused on a subject matter area, correctly assigning a query to an image domain versus a subject matter domain has increased difficulty.

One option for determining how to assign an ambiguous query is to use a general or generic secondary classifier that reviews the output from all of the query classifiers. The output from the query classifiers is aggregated, and the aggregated output is considered by the general secondary classifier to assign a query class. Such a general secondary classifier may improve the classification for some queries. However, since the general secondary classifier handles all types of subject matter, it is difficult to train the secondary classifier relative to the plurality of available domains.

In various embodiments, an improved method for classifying search queries is provided by using a plurality of meta-classifiers. A first group of query classifiers can be used to evaluate a query relative to various subject matter domains. This initial evaluation by the domain classifiers provides some type of ranking, probability, or other score for a query relative to the domains. The evaluation output or results from the first group of domain classifiers can then be used by a second group of meta-classifiers. The meta-classifiers are associated with subject matter categories that may correspond to a domain, or that may correspond to a plurality of domains. Because the meta-classifiers are limited in scope, the meta-classifiers can be trained to use the output from the domain classifiers in a focused manner. The meta-classifiers use the data from the first group of domain classifiers to evaluate the query relative to the categories corresponding to the meta-classifiers. If the query corresponds to at least one of the meta-classifier categories, the query is assigned to the meta-classifier category with the highest ranking, probability, or other score. Preferably, the meta-classifiers are initially trained using a data set different from the set of training queries (or other training data) used for training a corresponding subject matter domain classifier and/or any of the first group of domain classifiers. Preferably, the meta-classifiers are based on a non-linear ensemble model for combining the information from the domain classifiers to generate a meta-classifier ranking, probability, or other score. The assigned meta-classifier category can then be used in any convenient manner, such as by triggering additional uses of the search query to match alternative types of documents, such as use of the query in an image search, or by allowing a subject matter domain to be assigned to the query. In some embodiments, the meta-classifiers can be used to assign a query to one or more categories. In other embodiments, the meta-classifiers can be used to assign a query to a single category. In still other embodiments, the meta-classifiers can be used to assign a query to one or more categories, with some category assignments being mutually exclusive with each other.

Domain Classifier Operation and Output

When a search query is received, the query can be passed to a plurality of domain classifiers. A domain classifier is a query classifier that determines the relationship of a query to the subject matter corresponding to a single domain. A domain can have various levels of specificity. Some domains can be general, such as a domain corresponding to "news", while other domains can be more specific, such as a domain corresponding to "news-sports" or a domain corresponding to "news-sports-baseball". It is noted that having a hierarchical organization for domains is optional, so domains for "news" and "sports" do not necessarily have to be related within a classification scheme.

Depending on the domain classifier, a variety of evaluation factors may be used by a domain classifier to determine if a query is related to a domain. Some evaluation factors can be related to the keywords or other tokens in the query, possibly including the order of the keywords in the query. Other evaluation factors may be related to a search history context for a user that submitted the query. The search history context can include search context from within a current search session or browser session or search context over a longer period of time associated with a user. Still other evaluation factors may be related to a user context, such as a geographic location for a user or demographic data for a user. More generally, any type of factor that is used to match a query to a responsive search result can potentially be an evaluation factor for classifying a query relative to a domain.

By using a plurality of domain classifiers, each domain classifier can be trained to identify queries that are related to the domain for the domain classifier. Because each domain classifier focuses on a single domain, or possibly a limited number of domains, the domain classifiers for different domains can assign differing weights to the various factors that are considered in classifying a query. In some embodiments, the factors considered by a first domain classifier may be different from the factors considered by another domain classifier for a different domain.

By training the domain classifiers for individual subject matter domains, the domain classifiers can provide a series of evaluations for a query relative to each domain. Each evaluation provides a domain evaluation score (or classification score) for a query relative to a domain. The domain evaluation score can be a ranking value for comparison with other classification scores, a probability of association for a query with a domain, or a simple Boolean value. Any other convenient type of value or probability can be used as a domain evaluation score, as well as a combination of values or probabilities. In an alternative embodiment, one or more domains can have multiple domain classifiers. In such an embodiment, each of the domain classifiers for a domain can generate a ranking value and/or a probability of association for a query with the domain. These multiple values can be combined into a classification or evaluation score in any convenient manner.

One option for combining domain classification scores is to assign a query to each domain that has a ranking or probability above a threshold value. Another option is to assign a query to the domain having the highest ranking, and to also assign the query to any additional domains with a ranking that is sufficiently close to the highest value, such as at least 90% of the highest value. Still another option is to assign a query to only one domain, such as by assigning a query to the domain with the highest ranking. Yet another option is to assign domains based on values above a threshold, but to not allow assignment to domains that are considered mutually exclusive. For example, assignment of a query to the "commerce" domain may be considered as mutually exclusive to assigning a query to the "news" domain. Combinations of the above options can also be used if desired, such as combining minimum threshold ranking requirements with another one of the options.

In addition to domain evaluation scores, a domain classifier can generate additional outputs when evaluating a query. For example, a domain classifier can provide domain evaluation factors that contributed to the evaluation score, such as the factor that provided the largest contribution to the evaluation score, or the top five factors, or another selection of factors. While such evaluation factors are already incorporated into the domain evaluation score, the factors may be useful when comparing domain evaluation scores aggregated from domain classifiers associated with different domains.

After the domain classifiers have evaluated a query relative to various domains, the result is a group of domain evaluation results that include domain evaluation scores. At this stage, some queries can optionally be assigned to a domain. For example, if only one evaluation score is above a threshold value or threshold probability, the query can be assigned to the corresponding domain. However, in various situations, more than one classification score may be above a threshold value and/or threshold probability. In order to assign a query to a query class (such as a domain) and/or to provide a hierarchy of rankings for a query relative to query classes, a method is needed to distinguish between the potentially matching domains. Alternatively, it may be desirable to always use a subsequent meta-classification step to evaluate a query, regardless of the number of domain evaluation scores that are greater than a threshold value. Still another option can be to have a first threshold value for triggering use of meta-classification, while a second higher threshold value is used for actually assigning a query to a query class or domain.

Meta-Classifier Design and Training

In various embodiments, a plurality of meta-classifiers can be used to assist with assignment of queries to query classes and/or domains. A meta-classifier represents a second level of operation for query classification. A meta-classifier receives as input the evaluation result(s) from some or all of the domain classifiers. Preferably, the output from all of the domain classifiers is used as input for the meta-classifiers. The meta-classifiers then use the aggregated evaluation results to determine a subject matter area for the query. Each meta-classifier provides classification decision information for a specific subject matter area or meta-classifier category. The classification decision information includes a category score for the corresponding meta-classifier category. A meta-classifier category can correspond to a single domain or a plurality of domains. It is noted that a meta-classifier does not need to be available for all domains that are served by a domain classifier. If desired, meta-classifiers can be used for only categories of particular interest. Queries belonging to domains that do not have a corresponding meta-classifier category can be classified using other conventional techniques, such as by performing comparisons on the evaluation results of the domain classifiers.

Similar to the domain classifiers, a variety of alternatives are available for using the output from one or more meta-classifiers. One option is to assign a query to each meta-classifier category or subject matter domain that has a ranking or probability above a threshold value, where the ranking or probability for evaluating the assignment is based on a meta-classifier or a domain classifier. The meta-classifier ranking is used for domains where a meta-classifier is available, while the domain classifier ranking is used for any other domains. Another option is to assign a query to the domain having the highest ranking (based on meta-classifier rankings where available, domain classifiers for remaining domains), and to also assign the query to any additional domains with a ranking that is sufficiently close to the highest value, such as at least 90% of the highest value. Still another option is to assign a query to only one domain, such as by assigning a query to the domain with the highest ranking. Yet another option is to assign domains based on values above a threshold, but to not allow assignment to domains that are considered mutually exclusive. For example, assignment of a query to the "commerce" domain may be considered as mutually exclusive to assigning a query to the "news" domain. In still another option, a first threshold can be used to make a first domain or category assignment, while a second higher threshold is required for assigning a query to multiple domains. For example, a domain classifier or meta-classifier score of 30 on a ranking scale of 1-100 may be considered sufficient to allow assignment of a single domain or category to a query as a query class. For assignment of multiple query classes to a query, a second threshold value of 50 can be required for any additional classes. This type of stacking of thresholds provides a lower initial threshold to facilitate some type of query class assignment for a greater number of queries, but prevents assignment of multiple marginal categories. Combinations of the above options can also be used if desired, such as combining minimum threshold ranking requirements with another one of the options.

A meta-classifier differs from conventional multi-layer classifiers in a variety of ways. By using the evaluation results from a plurality of domain classifiers, a meta-classifier can generate classification decision information (including category scores) for a query using a wide range of data without requiring substantial additional resources. The computationally intensive portion of query classification is performed at the domain classifier level. Processing the results from the domain classifiers results in a reduced or minimal amount of consumption of additional processor time. A meta-classifier uses context information from domains outside of the category for which the meta-classifier will provide a category score. Thus, the meta-classifier makes use of an expanded range of information in determining decision information related to classification. Additionally, a portion of the input received by a meta-classifier corresponds to the subject matter area or domain(s) for which the meta-classifier provides classification decision information. Thus, the meta-classifier is different from conventional domain transfer classifiers.

In various embodiments, the meta-classifiers can also differ from domain classifiers with regard to the how the meta-classifiers are trained. Traditionally, domain classifiers are trained using a linear model, such as linear regression. In a linear model, a variety of features for the model are identified. A training set of data (such as queries) with known domain assignments is then used to fit weights for the features in the model. The weights are fit, for example, by using linear regression to determine weights that minimize the errors for the model over the training data set. This type of linear model approach appears to work in a satisfactory manner for a subject matter domain classifier.

For a meta-classifier, linear modeling approaches do not perform well. Part of this may be due to the fact that the same types of features and results generated by the domain classifiers are also used as factors for the meta-classifiers. This is believed to lead to over-reliance of a meta-classifier on any domain classifiers that are trained on the same or similar subject matter. Thus, an image meta-classifier will tend to rely too heavily on output from the corresponding image domain classifier.

It has been determined that a non-linear model improves the performance of a meta-classifier relative to a meta-classifier based on a linear model. Examples of non-linear models include boosting trees and random forests, although other convenient non-linear models can also be used. As an example, a "boosting tree" model is a suitable non-linear model for classification in various embodiments. In a boosting tree type classifier, the features used in non-linear model are created during training. An initial set of features can be selected in any convenient manner. The features are then modified during training by identifying potential modifications for the features that improve the fit, and then mixing the current features with the identified modification. The amount of current feature and identified modification in the mixture is determined based on a weighting factor. Typically this weighting factor is relatively small, so that many iterations of blending in modified features are used to arrive at the final feature set.

The modifications of the features can correspond to either changes in the functional form of the feature, or the modifications can correspond to splitting of a given feature into two features based on feature value. For example, a feature that can take on values from −1 to 1 could be split into a first feature with values from −1 to 0.2 and a second feature with values from 0.2 to 1. By splitting a feature in this way, each of the resulting features can be given an independent weight factor when training the model. Still another option is to allow new features to be formed during training based on combinations of features from prior iterations. Using one or more of the above boosting methods, the training of a meta-classifier can result in a feature set that differs from the feature sets used for the underlying domain classifiers, even though the "features" used for the meta-classifier can ultimately be derived from the features used for the underlying domain classifiers.

Another aspect for improving performance of a meta-classifier is to use a different set of training data for the meta-classifier, such as a different set of queries with known domain assignments. When a meta-classifier is trained using the same data set (or a substantially similar data set) as used for the underlying domain classifiers, the meta-classifier will again have a tendency to rely too heavily on input from the domain classifier of the corresponding subject matter domain. To avoid this, a different set of queries (or other training data) can be used for the meta-classifier. Depending on the embodiment, the training set for the meta-classifier can differ from the training set for all domain classifiers, or the training set for the meta-classifier can differ from the training set for the domain classifier for the corresponding subject matter domain. The training set for the meta-classifier can have no overlap with the training set for domain classifiers and/or the corresponding subject matter domain classifier. Alternatively, relative to the total number of items in the training set, the number of different items in the training set for the meta-classifier relative to the domain classifiers and/or corresponding subject matter domain classifier can be at least about 90%, or at least about 80%, or at least about 60%, or at least about 50%.

Figure 8:
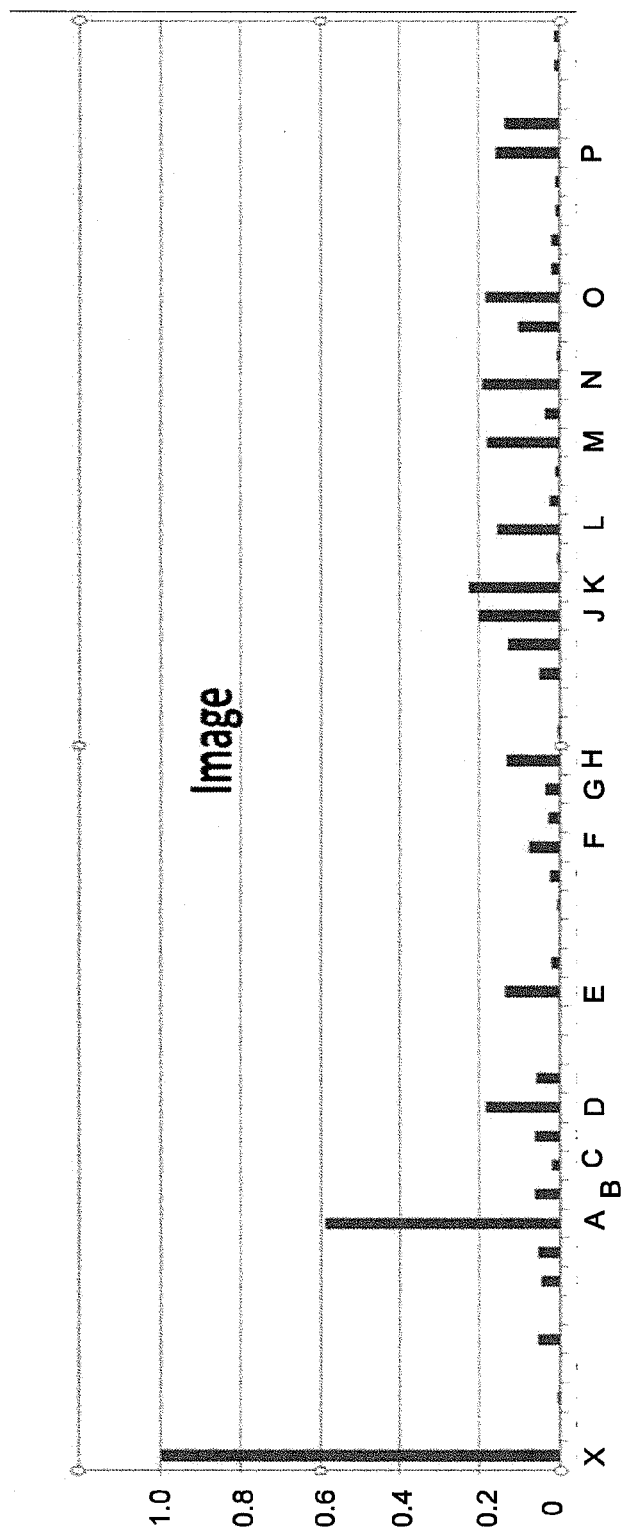
FIGS. 8-9 show examples of how a meta-classifier for a given meta-classifier category can benefit from using output from a variety of domain classifiers.
Figure 9:
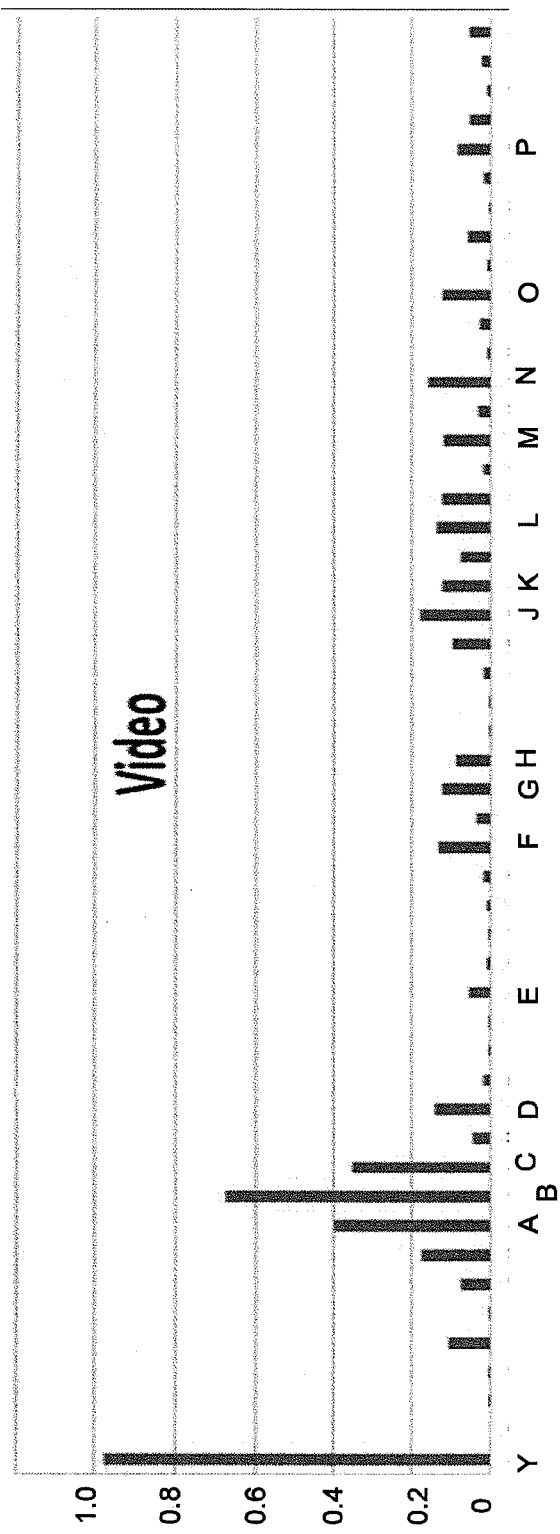

FIGS. 8-9 show examples of how a meta-classifier for a given meta-classifier category can benefit from using output from a variety of domain classifiers. FIGS. 8 and 9 show the correlation between the amount of information needed to classify a query in a domain versus the amount of information provided by various domain classifiers that is relevant to the determination. In these examples, a binary domain decision problem is represented by a random variable Y that takes value 0 or 1. The classifier's confidence is represented by the random variable X that takes an integer value in [0, 9], where each value represents an evenly distributed interval in [0, 1] that the output score from the classifier falls into. The entropy E(Y) and the mutual information I(X;Y) were computed from a randomly sampled query set used for classifier's performance evaluation—the query set contained about 2000 queries, including both positive and negative samples. The figures show the results of correlation for an image domain (FIG. 8) and a video domain (FIG. 9). FIGS. 8 and 9 show the entropy of the domain decision problem (left most bar in each chart) as well as the mutual information between 49 different classifiers' confidence scores and the domain decision problem.

In FIG. 8, the correlation for the 49 domain classifiers is shown relative to the image domain. FIG. 9 shows a similar correlation for the 49 domain classifiers relative to the video domain. A subset of these classifiers are labeled A-Q for ease of reference in identifying some of the domain classifiers with higher mutual information values. These domain classifiers correspond to subject matter domains for: A—Image; B—Video; C—Galleries; D—Books; E—a Sports category; F—Finance; G—Local; H—Navigational; J—Question and Answer; K—Weather; L—URL Query; M—Movie Title; N—TV Shows; O—Movie Showtimes; and P—Health. It is noted that for some domains, the information provided by another domain may be negative in nature. For example, a high confidence score from a math calculation domain may provide a negative correlation with another domain, such as a commerce domain. Also, the information provided by the various domains is not necessarily independent, so that the amount of information provided by combining two domains will not necessarily be the sum of the values for the two domains.

For example, in FIG. 8, the bar labeled "X" shows the amount of information needed in order to accurately classify a query as corresponding to the image domain or not corresponding to the image domain. As shown in FIG. 8, this information value is normalized to be approximately 1. The fractional values for the remaining bars show the amount of mutual information that can be provided by various domain classifiers. Classifier A (Image) corresponds to the domain classifier for the image domain. The image domain classifier has a mutual information score of roughly 60% for classifying a query relative to the image domain. However, this leaves an uncertainty (or entropy) of 40%. This remaining uncertainty can be removed at least in part by obtaining information from other classifiers. In FIG. 8, no other domain classifier has a mutual information score of greater than about 20%. Similarly, in FIG. 9, the bar labeled "Y" shows the amount of information needed in order to accurately classify a query as corresponding to the video domain or not corresponding to the video domain. Classifier B (Video) provides about 70% of the needed information. Classifier A (Image) and Classifier C (Galleries) have mutual information scores of about 40%, but these domains are also likely to be highly correlated with the video domain, so that the information provided by combining these classifiers is still likely less than all the needed information.

As shown in FIGS. 8 and 9, almost all of the 49 domain classifiers provide at least some mutual information for assisting with a classification decision for either the image or video domain. By using a meta-classifier, the output from such domain classifiers can be combined to improve the classification decision for a query.

Comparison of Meta-Classifier Models

Figure 3:
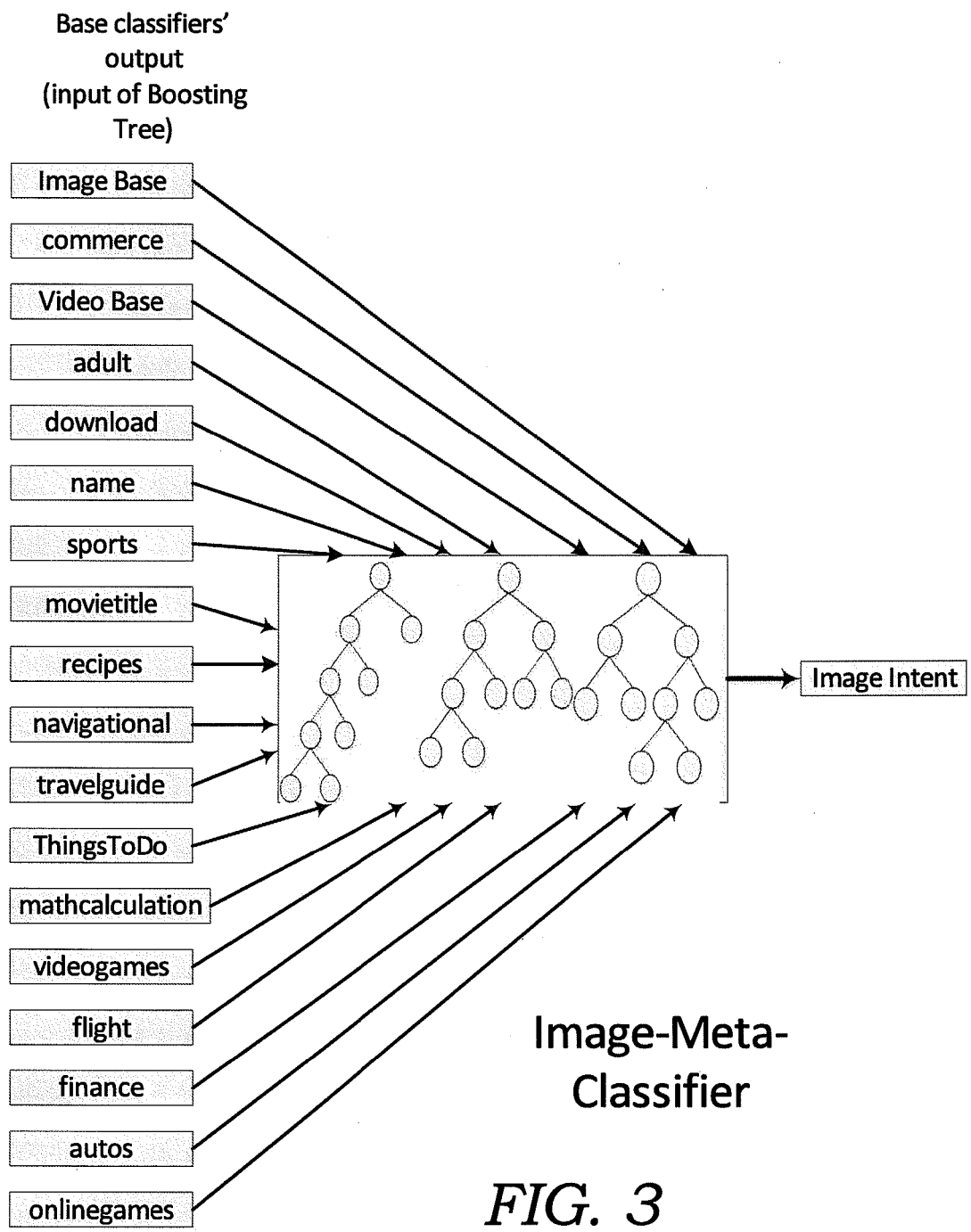
FIG. 3 schematically shows an example of the interaction between domain classifiers and a meta-classifier according to an embodiment of the invention.

To further investigate the benefits of various meta-classifier models, image meta-classifiers were formed based on several models. The image meta-classifiers included meta-classifiers using a Sparse Boosting Decision Tree, called BDT; a Mutliple Additive Regression Tree model, called MART; a Random Forest (RF) model; and Logistic Regression (Logit). The performance of the meta-classifiers was measured by a p-r curve. The training and testing data each comprised 20,000 labeled queries. The image meta-classifiers were used for classification of queries based on 20 first level subject matter domain classifiers. One of the subject matter domain classifiers corresponded to an image subject matter domain. FIG. 3 schematically shows an example of the subject matter domain classifiers that were used as inputs for the meta-classifiers. 18 of the 20 classifiers are shown. Of course, any convenient number of subject matter domain classifiers could be used. In FIG. 3, the meta-classifier is schematically shown as corresponding to a boosting tree type non-linear classifier.

The meta-classifier using the logistic regression model showed little improvement over the image subject matter domain classifier. This demonstrated that a linear combination model for a meta-classifier provides only limited improvement over a first level domain classifier. On the other hand, the three decision tree based models showed much better p-r curves than the base image classifier. Among the three models, the BDT model (Sparse Boosting) had the most compact model size (36 trees, each tree having 3 nodes only), but the least favorable p-r curve of the non-linear models. The random forest model (RF) had the largest model size (100 trees with 500 nodes per tree) and the second best p-r curve. The best model was the multiple-additive regression tree (MART) model, which provided the best result with an intermediate size (100 trees and 29 nodes per tree, or 15 leaf nodes per tree). At the algorithm level, the random forest model uses bagging to generate multiple trees, but the BDT and MART models use boosting to create multiple trees. Boosting is believed to be preferable relative to bagging in many applications. Between BDT (Sparse Boosting) and MART (Stochastic Gradient Boosting), the latter is better in precision and recall because the MART optimization criteria is based on Gradient Descent. The MART optimization also applies pruning to reduce over-fitting. Sparse Boosting has to generate balanced trees, i.e., the number of leaf nodes is fixed to be $2^D$ where D is the tree depth. By contrast, MART can generate a tree with any number of leaf nodes, which allows for more control of model granularity.

Although MART may provide better performance than BDT in precision and recall, the additional performance benefit is not large. Additionally, the results generated using the BDT are generated based on a tree size is usually small relative to other types of non-linear models. When tuning a BDT model, once the tree size reaches a certain point, increasing tree size will actually hurt the performance (overfitting). Thus, it is relatively easy to get an optimal but compact tree size using a BDT model.

Meta-Classifier Operation and Output

In some embodiments, all available meta-classifiers can receive the aggregated output from all available domain classifiers. This allows each meta-classifier to start with the same data. Each meta-classifier, however, can assign different weights to the output information from the domain classifiers using the training method described above. This allows the meta-classifiers to be trained individually to arrive at query classification decisions.

As an initial step, the evaluation results from the domain classifiers are aggregated. The aggregation can take place on each meta-classifier, or the evaluation output can be aggregated first and then distributed to the one or more meta-classifiers. Still other aggregation options can be used that allow the meta-classifiers to receive evaluation information from at least a plurality of the domain classifiers. The evaluation information from each domain classifier can include a ranking score for the domain, a probability of association with the domain, or a combination thereof. Additionally, the evaluation information can include one or more evaluation factors used by the domain classifiers to determine the ranking score and/or probability. For example, the additional one or more evaluation factors can be provided with identifiers indicating the nature of the corresponding factor. Alternatively, the additional factors can be provided as part of an array of factor values, where the position of the factor in the array indicates the identity or nature of the factor. Optionally, such an array of factor values may be sparsely populated, with only a few of the array values corresponding to a non-zero value.

After receiving the evaluation information from the domain classifiers, each meta-classifier can use the aggregated evaluation information to generate classification decision information for a query relative to the category for the meta-classifier. The meta-classifier can generate a ranking value, probability value, or other category score that indicates the association of a query with a subject matter area. The category scores from the meta-classifiers can then be compared. If none of the category scores is above a threshold value, then the query is not associated with any of the meta-classifier categories. If at least one of the category scores is above a threshold value, the query can be assigned to one or more meta-classifier categories, such as all categories with a score above the threshold value and/or all categories with a score within 90% of the highest category score. If a meta-classifier corresponding to a highest category score is associated with multiple domains, the outputs from the domain classifiers may be used to select one or more domains within the meta-classifier domains. For example, a meta-classifier may have a subject matter area of "commerce", which represents a query that indicates a user who intends to purchase something. In this example, the subject matter area of "commerce" can correspond to two domains. One domain is a "shopping—electronics" domain, which includes a variety of software and computer hardware products. This area also includes items such as music downloads, electronic books, and other items that can be downloaded via a network. The other domain is a "shopping—general" domain. If the "commerce" meta-classifier generates the highest meta-classifier category score, the query will be assigned to at least one of the domains within the commerce subject matter area. The domain evaluation scores from the domain classifiers for "shopping—electronics" and "shopping—general" are then used to assign the query to at least one of the domains within the commerce category. Optionally, the query can be assigned to both domains within the commerce category. Optionally, the domains within the commerce category can be considered mutually exclusive, so that assignment of the query to "shopping—electronics" prevents assignment to "shopping—general", and vice versa.

Assigning a query to a subject matter domain or a meta-classifier category can result in a number of actions. The assignment of a query to a category can be used as part of the process for identifying results that are responsive to the query. For example, based on the assigned query class, the results identified for a query can be refined to give a higher ranking to results within the assigned query class. As noted previously, a query can be assigned to one or more meta-classifier categories and/or subject matter domains, such as a plurality of meta-classifier categories and/or subject matter domains.

In other embodiments, assigning a query to a meta-classifier subject area can trigger additional types of searching. For example, a meta-classifier can be associated with a subject matter area corresponding to "images". When a query is assigned to the images subject matter area, this represents a query where the user's intent is to find an image as the search result. Assignment to the images category can result in submitting the query to one or more additional search engines for performing image based searches. Optionally, the query can be modified to improve the query results in the image based search engines. Alternatively, matching a query to a subject matter area of "travel" could trigger a different type of handling for a query. A travel query parser could be used to match the query terms to one or more templates for extraction of information such as an origination and/or destination city or a type of desired travel (such as plane or train).

Still another option can be to use assignment to a meta-classifier category as a trigger for processing a query in additional and/or different manners than a conventional query. One option is to use the meta-classifier assignment to initiate special interfaces. In the "commerce" example above, a query was assigned to a subject matter area that involved two types of shopping domains. In such an example, based on the assignment first to the commerce category, and then the "shopping—electronics" domain, a specialized shopping interface can be displayed to the user. A similar behavior could be used for assignment to other subject matter areas, such as when a query is assigned to a subject matter area corresponding to travel or entertainment.

In some embodiments, a query may have a sufficient ranking relative to one or more ranking thresholds and/or relative to a highest ranking value to trigger multiple additional searches. For example, a query with a sufficient ranking in an image category or domain can also have a sufficient ranking in a video category or domain and a travel category or domain. Thus, a single query could have sufficient rankings in a plurality of categories to trigger additional searches and/or interfaces and/or other events based on multiple categories.

Example of Operation of Meta-Classifiers

The following are prophetic examples of operation of a system using both domain classifiers and meta-classifiers to perform query classification. In the following examples, a query classification system involves a first layer of 50 domain classifiers. The domain classifiers generated evaluation information for a query relative to a domain. Optionally, the domain classifiers can operate on dedicated processors, dedicated virtual machines, or another distinct computing unit in order to improve processing speed for a query. The domains include a variety of topics, including news, sports, weather, health, home improvement, celebrities. Some domains represent sub-categories of other domains. Thus, in addition to the domain for "news", there is a domain for "news—politics." Additional domains correspond to various types of entertainment activities, such as domains for dining, movies, live performances, and sporting events. Still other domains include domains for shopping—electronics, shopping—vehicle, and shopping—general. Additionally, several domains are available that represent categories that may intersect with other domains. These domains include categories for travel, images, and videos.

A second meta-classifier layer is also available in addition to the domain classifier layer. Optionally, the meta-classifier layer can be hosted on separate processors, virtual machines, or computing units. The meta-classifier layer contains 5 meta-classifiers, as opposed to the 50 domain classifiers. Three of the meta-classifiers correspond to the images, videos, and travel domains. A fourth meta-classifier corresponds to the subject matter area of commerce, and corresponds to the three shopping domains (electronics, automotive, general). The remaining meta-classifier represents an entertainment category, and corresponds to the domains for dining, movies, live performances, and sporting events. If desired, the meta-classifier layer could include enough meta-classifiers so that each domain corresponds to one of the meta-classifier categories.

One or more sets of training data, such as one or more sets of labeled queries, are initially used to train the domain classifiers for query evaluation relative to each of the respective domains. The domain classifiers can be trained in any convenient manner, such as by using a linear regression method to fit weights to features based on the labeled queries in the training set(s). In this example, the domain classifiers are designed to provide a probability of association between a query and a domain. For the search engine used in this example, it has been determined that the search engine provides improved results when queries can be assigned to a query category, even if the assignment is somewhat speculative. As a result, a domain threshold level is set for the domain classifiers of 30%. If a domain classifier provides an association probability of lower than 30%, then the query is determined to not be associated with that domain. If at least one value is greater than 30%, the probabilities from the domain classifiers are further compared in order to assign the query to at least one domain. The further comparison can correspond to a comparison of probabilities between domain classifiers, or the further comparison can correspond to a comparison of scores or probabilities calculated by meta-classifiers. For assignment of a query to more than one query class (i.e., category or domain), the additional query classes have to have probabilities greater than 50%. In the following examples, regardless of the probability generated by a domain classifier, the evaluation results from all domain classifiers are aggregated for use by the meta-classifiers during query classification.

After training the domain classifiers, the meta-classifiers are also trained. In this example, all of the labeled queries (or other training set elements) used for training the meta-classifiers are distinct from the labeled queries used for training any of the domain classifiers. Alternatively, the labeled queries for training each meta-classifier can be selected to be different from the labeled queries used for the corresponding subject matter domain classifiers. Still another option could be to have a portion of distinct labeled queries, such as at least 50%.

In this example, the initial features for the meta-classifiers are selected to be the output scores from the domain classifiers, plus various additional feature used by one or more of the domain classifiers. A boosting tree method is then used to modify the features for the meta-classifiers during training. Although any convenient non-linear training method could be used, this example used a multiple additive regression trees model for each meta-classifier.

In order to train the meta-classifiers, the labeled queries in a training set are first evaluated by the domain classifiers (which have already been trained) to generate domain evaluation scores. The evaluation scores are then aggregated for use by each meta-classifier. In this example, the meta-classifiers are designed to provide a probability of association between a query and a meta-classifier category. Because some domains do not have a corresponding meta-classifier, queries with a marginal association should not necessarily be associated with a meta-classifier category. As a result, a meta-classifier threshold level is set at 50%. If a meta-classifier provides an association probability of lower than 50%, then the query is determined to not be associated with the corresponding meta-classifier category. If at least one category score is greater than 50%, the query is assigned to one or more meta-classifier categories. The meta-classifier with the highest probability (or other category score) is used to assign the query to the corresponding category. This continues for each meta-classifier with a category score greater than 50%. Optionally, if two or more of the meta-classifiers have a mutually exclusive relationship, a category assignment of the query to a first meta-classifier category is a second mutually exclusive category has already been assigned (such as based on a higher category score). After training, the query classification system (including the domain classifiers and the meta-classifiers) is ready for use in assigning queries to subject matter and/or domains.

EXAMPLE 1

In a first prophetic example, a user can enter a search query of "Jordan basketball". As part of processing for this query, the query classification system is used to determine a query class. First, the query is processed by each of the domain classifiers. Several of the domain classifiers provide a probability of greater than 30%, including domain classifiers for sports (greater than 50%), sports-basketball (greater than 50%, highest probability), news-international (between 30%-50%), and images (between 30%-50%). The highest probability corresponds to sports-basketball. The evaluation results from all of the domain classifiers are then aggregated and passed to the meta-classifiers. Because of the somewhat ambiguous nature of the query, none of the meta-classifiers generates a score of greater than 50%. As a result, the highest value from the domain classifiers is used to assign a domain of sports-basketball for the query. Based on the domain/sub-domain relationship, in this example the domain of sports-basketball is considered mutually exclusive with the domain of sports, so a second assignment of the query to the sports domain is not made. The assigned domain of sports-basketball is then used by a search engine as part of the information for identifying and/or ranking responsive results. Alternatively, if domains are not identical to query classes, the assigned domain could be converted to a query class prior to forwarding the domain to the search engine. A listing of the highest ranking responsive results are then returned by the search engine for display to the user.

After viewing the results provided by the search engine, the user modifies the search query to "Jordan basketball dunk" and submits the query again. The same domains of sports, sports-basketball, news-international, and images are evaluated by the domain classifiers as having an association probability of greater than 30%. Once again, the domain of sports-basketball is identified as the highest probability domain. The aggregated output from the domain classifiers is then passed to the meta-classifiers. Based on the additional term, the meta-classifier for the subject matter "images" generates a probability of greater than 50%.

Because the images probability is greater than the threshold value and is the highest meta-classifier value, the category "images" and the domain "images" are assigned to the query in addition to the domain of sports-basketball. In this example, the category assignment and domain assignment are used for separate purposes. The assignment to the domain "images" is used by the primary search engine along with the assigned domain of sports-basketball for identifying responsive results. Additionally, the assignment to the "images" category by the meta-classifier initiates a secondary search. Alternatively, assignment to just the domain or just the category could be used both for searching by the primary search engine and for triggering the secondary search. The search query is modified to adapt the query for use in an image search engine. The image search engine identifies primarily image and/or video based results. Based on the modified search query, the image search engine provides a second set of responsive results. The results from the primary search engine and the secondary (image) search engine are displayed to a user. The search results from the image search engine are displayed in a separate portion of a display area to the user.

EXAMPLE 2

Later during the search session, the user submits a query of "cannon quality review." After processing by the domain classifiers, no domain has a probability greater than 30%. The output from the domain classifiers is aggregated and passed to the meta-classifiers. The meta-classifiers also do not generate a probability greater than a threshold value. As a result, no category, domain, or query class is assigned. The query is processed by the search engine without a domain or query class assignment.

The user then refines the query to "cannon picture quality". During pre-processing of the query, the search engine modifies the query to substitute the name of a camera maker for the first term. The query as modified by the pre-processor is then processed by the domain classifiers. Probabilities greater than the threshold value of 30% are calculated for domains related to shopping-electronics and images. The aggregated results are then passed to the meta-classifier processors. A value greater than 50% is generated for both the category "commerce" and the category "images." Because the probability is higher for the category corresponding to commerce, the commerce category is associated with the query first. Because commerce is not mutually exclusive to images in this example, the category of images is also assigned to the query. Several domains correspond to commerce, including the domain for shopping-electronics. The domains within the commerce category are considered mutually exclusive in this example. Because shopping-electronics is the highest rated domain corresponding to the commerce subject matter, shopping-electronics is assigned as the domain for the query. Additionally, a separate commerce interface is launched on the display of the user. The separate commerce interface can, for example, be launched in a new browser window. The pre-processed search query is used in a commerce search engine to provide responsive results within the format of the commerce interface. Optionally, conventional search results can also be provided based on the primary search engine.

Example of System for Using Meta-Classifiers

Figure 4:
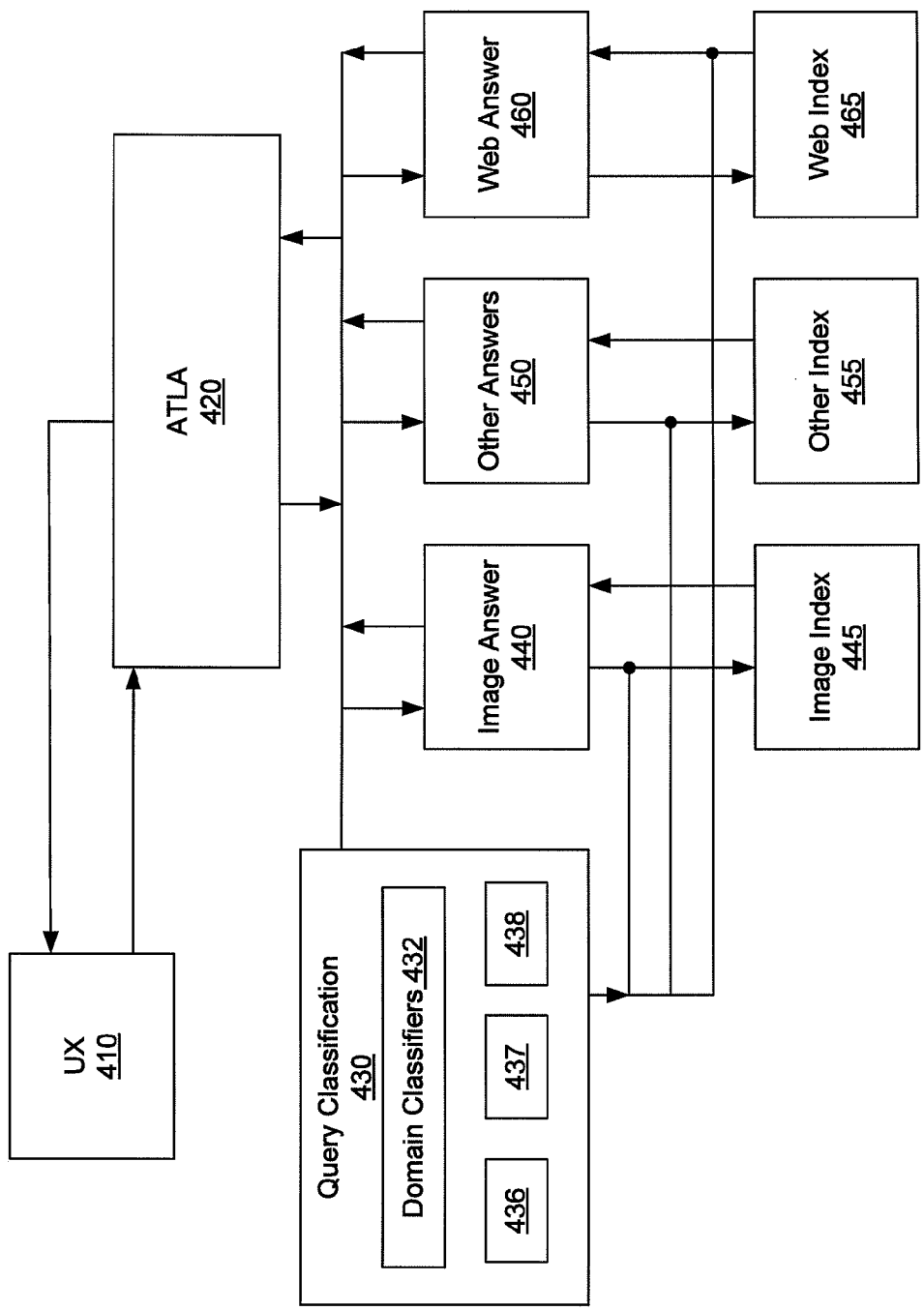
FIG. 4 schematically shows an example of using query classification as part of providing answers in response to a query according to an embodiment of the invention.

FIG. 4 shows an example of how meta-classifiers can be integrated as part of a system for generating responsive results for a query. In FIG. 4, a user interface or user experience (UX) 410 allows a user to submit a search query. The query, along with any corresponding context for the query, can be provided to a search engine, represented in FIG. 4 as an Aggregated Top Level Answer (ATLA) service 420. The ATLA service then provides the query (and optional corresponding context) to several services. In FIG. 4, the query is provided to a web answer service 460, which represents a conventional service for providing documents from a network in response to a search query. The query is also provided to a query classification service 430. The query classification service uses a first set of domain classifiers 432 to provide initial classification scores for a query. The output from the domain classifiers can then be passed to meta-classifiers, such as meta-classifiers 436, 437, and 438, to determine meta-classifier scores for any categories represented by a meta-classifier. Depending on the scores from the domain classifiers and the meta-classifiers, a classification is determined for a query.

The query classification is then used in various ways. One use for the query classification is as a potential trigger for additional searches. For example, if the query is classified as an image query, this classification is used to trigger having image answer service 440 perform a search of image index 445. This is shown by the intersection of the output from query classification 430 having an intersection with the input from image answer service 440 to image index 445. Alternatively, if the query is classified as corresponding to another type of secondary search, such as other answer 450, a search of other index 455 can be triggered. Still another option is to use the classification scores generated by query classification service 430 to trigger secondary searches for any categories with a sufficiently high classification score. In the example shown in FIG. 4, this would correspond to triggering searches by both image answer service 440 and other answer service 450. In still other embodiments, any arbitrary number of additional answer services or other types of additional services could be triggered based on the classification scores. Other types of additional services that could be triggered, for example, include specialized interfaces such as a shopping interface based on a meta-classification of a query as a commerce query.

In addition to triggering other answer services or additional interfaces, the query classification can also be used to improve the results from the primary answer or network answer index. This is shown in FIG. 4 by the intersection of the output from classification service 430 with the return of information from web index 465 to web answer service 460. In the embodiment shown in FIG. 4, the output from classification service 430 is used to improve the ranking and/or filtering of answers after identifying potentially responsive results from web index 465. This choice is made in order to improve the response time. Alternatively, the search of the primary index could also wait for the query classification in order to improve the initial identification of responsive documents in the web index 465.

The results from web search service 460 and the results from any triggered additional services, such as image answer service 440 or other answer service 450, are then passed back to the ATLA 420. The ATLA then formats the available answers and/or responsive documents and provides the formatted information back to the user via user interface or experience 410.

ADDITIONAL EXAMPLES

Having briefly described an overview of various embodiments of the invention, an exemplary operating environment suitable for performing the invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

The computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that does not correspond to a signal per se, that can be used to encode desired information, and that can be accessed by the computing device 100. In an embodiment, the computer storage media can be tangible computer storage media.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The memory 112 can include computer-storage media in the form of volatile and/or nonvolatile memory. The memory may be removable, non-removable, or a combination thereof.

Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 can allow the computing device 100 to be logically coupled to other devices including the I/O components 120, some of which may be built in. Illustrative components can include a microphone, joystick, game pad, satellite dish, scanner, printer, wireless device, etc.

Figure 2:
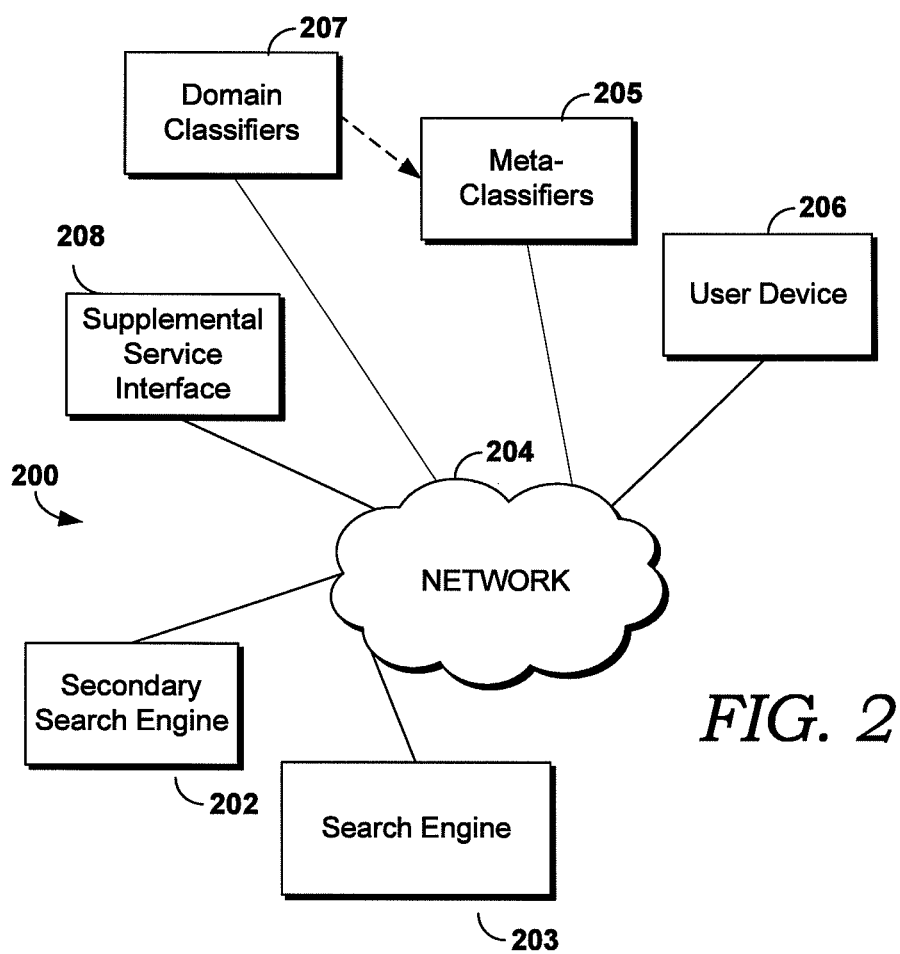
FIG. 2 schematically shows a network environment suitable for performing embodiments of the invention.

With additional reference to FIG. 2, a block diagram depicting an exemplary network environment 200 suitable for use in embodiments of the invention is described. The environment 200 is but one example of an environment that can be used in embodiments of the invention and may include any number of components in a wide variety of configurations. The description of the environment 200 provided herein is for illustrative purposes and is not intended to limit configurations of environments in which embodiments of the invention can be implemented.

The environment 200 includes a network 204, a user device 206, a search engine 203, and a secondary search engine 202. The environment also includes a plurality of domain classifiers 207, a plurality of meta-classifiers 205, and a component for providing a supplemental service interface 208. The network 204 includes any computer network such as, for example and not limitation, the Internet, an intranet, private and public local networks, and wireless data or telephone networks. The user device 206 can be any computing device, such as the computing device 100, from which a search query can be provided. For example, the user device 206 might be a personal computer, a laptop, a server computer, a wireless phone or device, a personal digital assistant (PDA), or a digital camera, among others. In an embodiment, a plurality of user devices 206, such as thousands or millions of user devices 206, can be connected to the network 204. The search engine 203 includes any computing device, such as the computing device 100, and provides functionalities for a content-based search engine. Secondary search engine 202 can be a conventional search engine similar to search engine 203, or secondary search engine can be adapted for searching a specific type of subject matter, such as images, videos, travel, or commerce. When a search query is received form a user device 206, the query is passed to domain classifiers 207 for evaluation. The evaluation results from domain classifiers 207 can be passed to meta-classifiers 205 via network 204, or the domain classifiers 207 can have a direct link with meta-classifiers 205 as shown by the dotted-line arrow. When a meta-classifier category is assigned to a query, the assignment can optionally initiate a search using secondary search engine 202 and/or initiate a supplemental service interface 208 for display of a service on user device 206, such as a shopping service interface.

Figure 5:
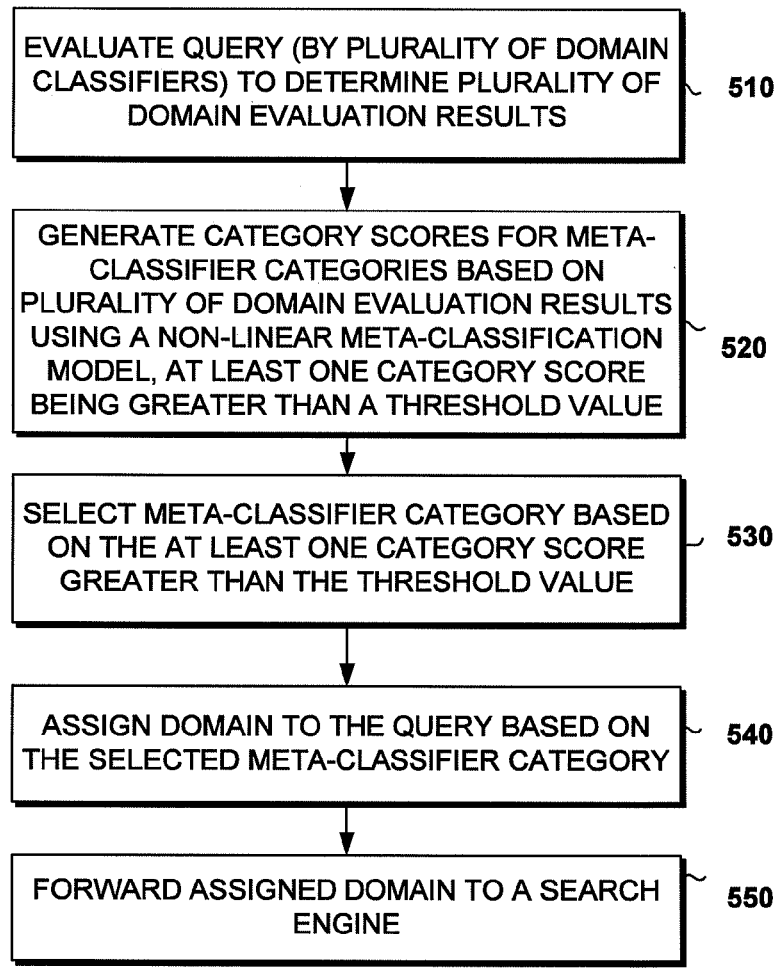
FIGS. 5-7 show examples of methods according to various embodiments of the invention.

FIG. 5 shows an example of a method according to the invention. In FIG. 5, a query is evaluated 510 by a plurality of domain classifiers. The query is evaluated to determine a plurality of domain evaluation results. Category scores are generated 520 for meta-classifier categories based on the plurality of domain evaluation results. Preferably, the category scores are generated by meta-classifiers that are based on a non-linear classification model. In the embodiment shown in FIG. 5, at least one category score is greater than a threshold value. A meta-classifier category is then selected 530 based on the at least one category score that is greater than the threshold value. A domain is assigned 540 to the query based on the selected meta-classifier category. The assigned domain is then forwarded 550 to a search engine, such as for use in identifying responsive results.

Figure 6:
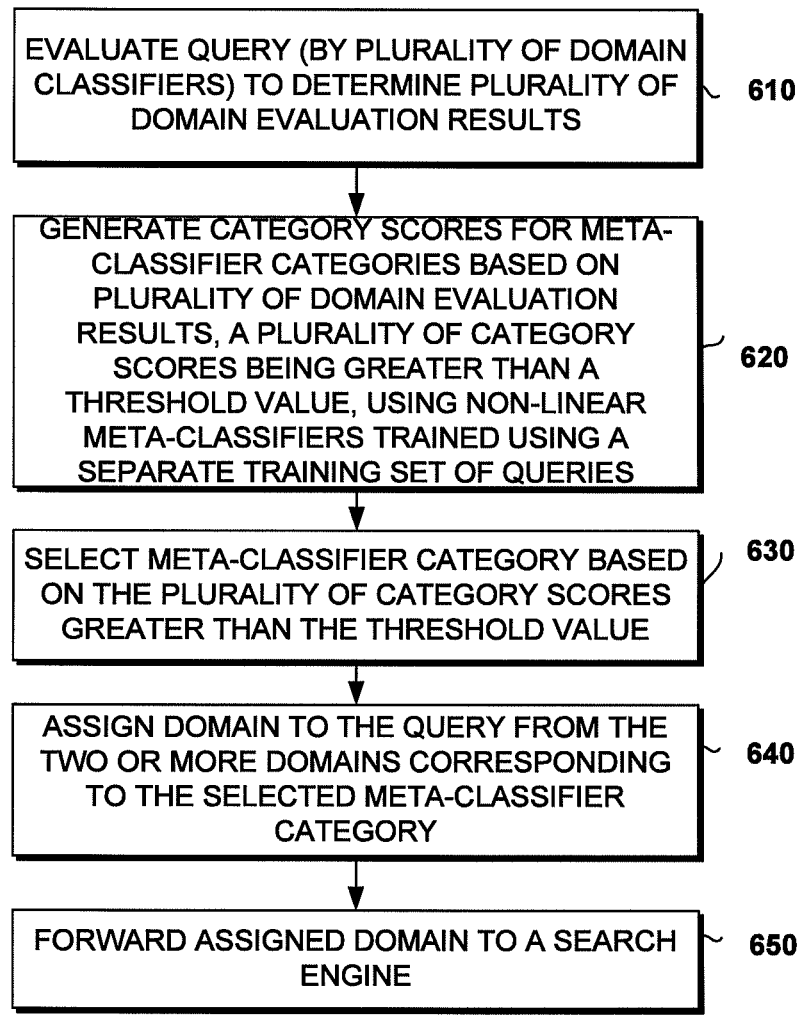

FIG. 6 shows another example of a method according to the invention. In FIG. 6, a query is evaluated 610 by a plurality of domain classifiers. The query is evaluated to determine a plurality of domain evaluation results. Category scores are generated 620 for meta-classifier categories based on the plurality of domain evaluation results. Preferably, the category scores are generated by meta-classifiers that are based on a non-linear classification model. Additionally, the meta-classifiers for generating the category scores are preferably trained using a first training set of queries that is different from a second training set of queries for training of the domain classifiers. In the embodiment shown in FIG. 6, a plurality of the category scores are greater than a threshold value. A meta-classifier category is then selected 630 based on the plurality of category scores that are greater than the threshold value. In the embodiment shown in FIG. 6, the selected category corresponds to two or more domains. A domain is assigned 640 to the query based on the selected meta-classifier category. The assigned domain is a domain that corresponds to the meta-classifier category. The assigned domain is then forwarded 650 to a search engine, such as for use in identifying responsive results.

Figure 7:
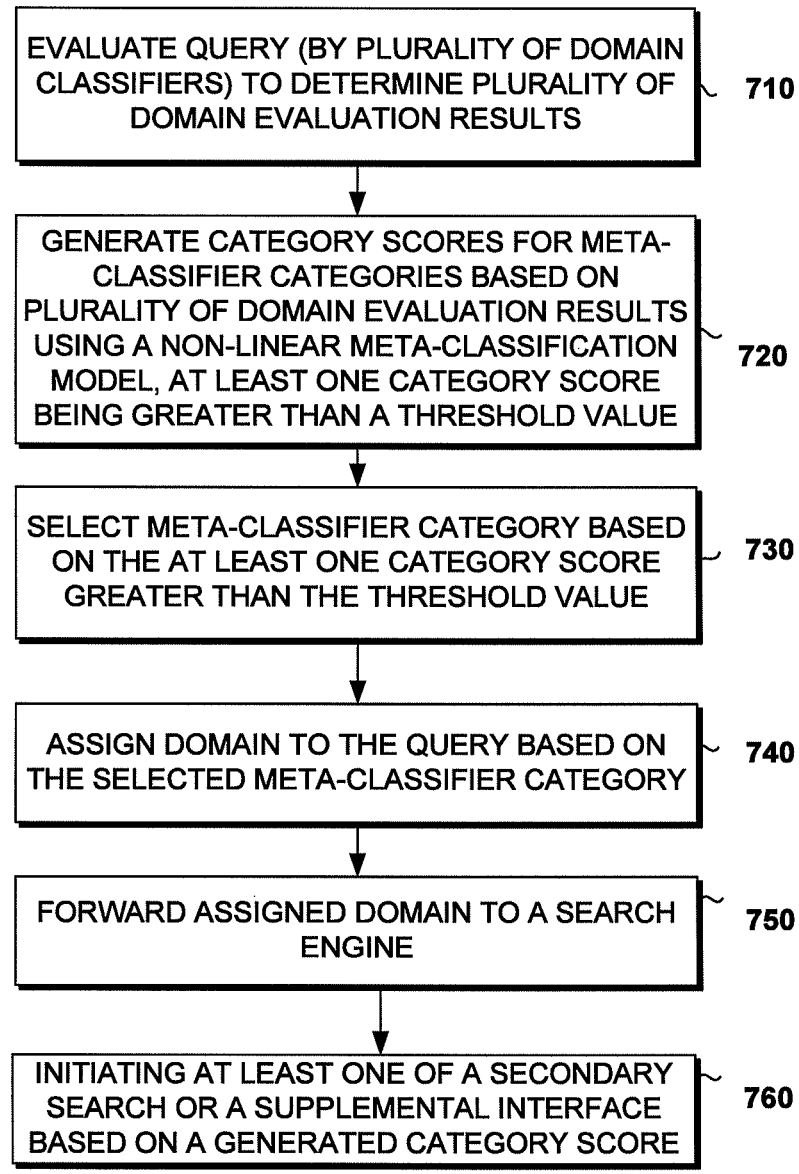

FIG. 7 shows an example of a method according to the invention. In FIG. 7, a query is evaluated 710 by a plurality of domain classifiers. The query is evaluated to determine a plurality of domain evaluation results. Category scores are generated 720 for meta-classifier categories based on the plurality of domain evaluation results. Preferably, the category scores are generated by meta-classifiers that are based on a non-linear classification model. Additionally, the meta-classifiers for generating the category scores are preferably trained using a first training set of queries that is different from a second training set of queries for training of the domain classifiers. In the embodiment shown in FIG. 7, at least one category score is greater than a threshold value. A meta-classifier category is then selected 730 based on the at least one category score that is greater than the threshold value. A domain is assigned 740 to the query based on the selected meta-classifier category. The assigned domain is forwarded 750 to a search engine, such as for use in identifying responsive results. Additionally, at least one of a secondary search or a supplemental interface is initiated 760 based on the generated category scores.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A computer-implemented method for classifying a query, comprising:

evaluating a query, by a plurality of domain classifiers, to determine a plurality of domain evaluation results comprising domain evaluation scores, the plurality of domain classifiers corresponding to a plurality of domains;

generating category scores for two or more meta-classifier categories based on the plurality of domain evaluation results using a non-linear meta-classification model to combine the domain evaluation scores, at least one generated category score being greater than a threshold value;

selecting one or more meta-classifier categories based on the at least one generated category score;

assigning at least one domain to the query based on the one or more selected meta-classifier categories, the assigned at least one domain being included within the selected one or more meta-classifier categories; and forwarding the assigned at least one domain to a search engine.

2. The computer-implemented method of claim 1, further comprising initiating at least one of a secondary search or a supplemental interface based on the selected meta-classifier categories.

3. The computer-implemented method of claim 2, wherein the secondary search comprises an image search.

4. The computer-implemented method of claim 1, further comprising initiating a plurality of supplemental searches, supplemental user interfaces, or a combination thereof based on the generated category scores.

5. The computer-implemented method of claim 1, wherein forwarding the assigned at least one domain to a search engine comprises:

assigning a query class to the received query based each assigned domain; and forwarding the assigned query classes to the search engine.

6. The computer-implemented method of claim 1, further comprising determining responsive results for the received query, the determining being performed by the search engine after receiving the assigned domain.

7. The computer-implemented method of claim 1, wherein the domain evaluation results comprise one or more domain evaluation factors.

8. The computer-implemented method of claim 7, wherein the domain evaluation scores comprise a probability, a ranking value, or a combination thereof.

9. The computer-implemented method of claim 7, wherein a domain evaluation score for the assigned domain is less than at least one other domain evaluation score.

10. The computer-implemented method of claim 1, wherein at least one meta-classifier category corresponds to two or more domains of the plurality of domains.

11. The computer-implemented method of claim 1, wherein generating category scores based on the plurality of domain evaluation results comprises:

aggregating domain evaluation results from each domain classifier; and generating category scores based on the aggregated domain evaluation results.

12. One or more computer-storage media storing computer-useable instructions that, when executed by a computing device, perform a method for classifying a query, comprising:

evaluating a query, by a plurality of domain classifiers, to determine a plurality of domain evaluation results comprising domain evaluation scores, the plurality of domain classifiers corresponding to a plurality of domains;

generating category scores for two or more meta-classifier categories based on the plurality of domain evaluation results, a plurality of the generated category scores being greater than a threshold value;

selecting one or more meta-classifier categories based on the plurality of generated category scores, the selection being based on a comparison of the plurality of generated category scores, at least one selected meta-classifier category corresponding to two or more domains from the plurality of domains;

assigning at least one domain to the query from the two or more domains corresponding to the at least one selected meta-classifier category; and forwarding the assigned at least one domain to a search engine, wherein the category scores for the two or more meta-classifier categories are generated by meta-classifiers based on a non-linear classification model to combine the domain evaluation scores, the meta-classifiers being trained on a first training set of queries that is different from a second training set of queries for the training of at least one domain classifier.

13. The computer-storage media of claim 12, wherein the domain evaluation results include domain evaluation scores, and wherein assigning at least one domain to a query further comprises assigning a domain based on a comparison of domain evaluation scores from the two or more domains corresponding to the selected meta-classifier category.

14. The computer-storage media of claim 12, wherein the domain evaluation results comprise domain evaluation scores and one or more domain evaluation factors.

15. The computer-storage media of claim 14, wherein at least 50% of the queries in the first training set of queries are different from queries in the second training set of queries.

16. The computer-storage media of claim 14, wherein at least 90% of the queries in the first training set of queries are different from queries in the second training set of queries.

17. The computer-storage media of claim 14, wherein the second training set of queries is used for training the plurality of domain classifiers.

18. The computer-storage media of claim 14, wherein the second training set of queries is used for training at least one domain classifier corresponding to a subject matter domain of at least one meta-classifier.

19. The computer-storage media of claim 14, further comprising initiating at least one of a secondary search and a supplemental interface based on the selected one or more meta-classifier categories.

20. A computer-implemented method for classifying a query, comprising:

evaluating a query, by a plurality of domain classifiers, to determine a plurality of domain evaluation results comprising domain evaluation scores, the plurality of domain classifiers corresponding to a plurality of domains;

generating category scores for two or more meta-classifier categories based on the plurality of domain evaluation results using a non-linear meta-classification model to combine the domain evaluation scores, at least one generated category score being greater than a threshold value;

selecting one or more meta-classifier categories based on the at least one generated category score;

assigning at least one domain to the query based on the selected one or more meta-classifier categories, the assigned at least one domain being included within the selected meta-classifier categories;

forwarding the assigned at least one domain to a search engine; and initiating at least one of a secondary search or a supplemental interface based on the generated category scores,
wherein the meta-classifiers for generating the meta-classification scores are trained on a first training set of queries that is different from a second training set of queries for the training of at least one domain classifier.

* * * * *